United States Patent [19]

Borrow

[11] Patent Number: 4,768,329

[45] Date of Patent: Sep. 6, 1988

[54] BATCHING MACHINE FOR ASSEMBLING CONTAINERS IN BATCHES

[76] Inventor: Edgar W. Borrow, Padnell Grange, Cowplain, Portsmouth PO8 8ED, United Kingdom

[21] Appl. No.: 108,896

[22] Filed: Oct. 14, 1987

[30] Foreign Application Priority Data

Oct. 24, 1986 [GB] United Kingdom ............... 8625541

[51] Int. Cl.⁴ .................... B65B 35/40; B65B 13/06
[52] U.S. Cl. ....................................... 53/543; 53/586
[58] Field of Search ............... 53/154, 543, 537, 586, 53/591, 220, 228

[56] References Cited

U.S. PATENT DOCUMENTS

| | | | |
|---|---|---|---|
| Re. 28,535 | 9/1975 | Ganz | 53/543 X |
| 3,760,553 | 9/1973 | Schmidt, Sr. et al. | 53/537 X |
| 3,802,154 | 4/1974 | Dillon | 53/154 |
| 3,876,057 | 4/1975 | Jones | 53/543 X |
| 3,941,236 | 3/1976 | Hagedorn | 53/537 X |
| 4,211,056 | 7/1980 | Birk | 53/543 |
| 4,633,655 | 1/1987 | Nigrelli, Sr. | 53/543 |

Primary Examiner—Horace M. Culver
Attorney, Agent, or Firm—Leydig, Voit & Mayer

[57] ABSTRACT

A batching machine for assembling containers in batches comprises a pair of conveyor tracks for moving the containers to an assembly station, and a pivoted gate member which carries barrier means at each end and which is rocked to cause the barriers to interrupt the flow of containers along the tracks alternately while allowing a predetermined number of containers on the other track to pass to the assembly station to form a group against a stop. Alternately operating pushers move each completed group of containers transversely from the tracks onto a central conveyor so that groups from one track alternating with groups from the other track are carried to a securing station for taping the containers together and then separating them into batches containing containers from each track in a predetermined combination.

13 Claims, 3 Drawing Sheets

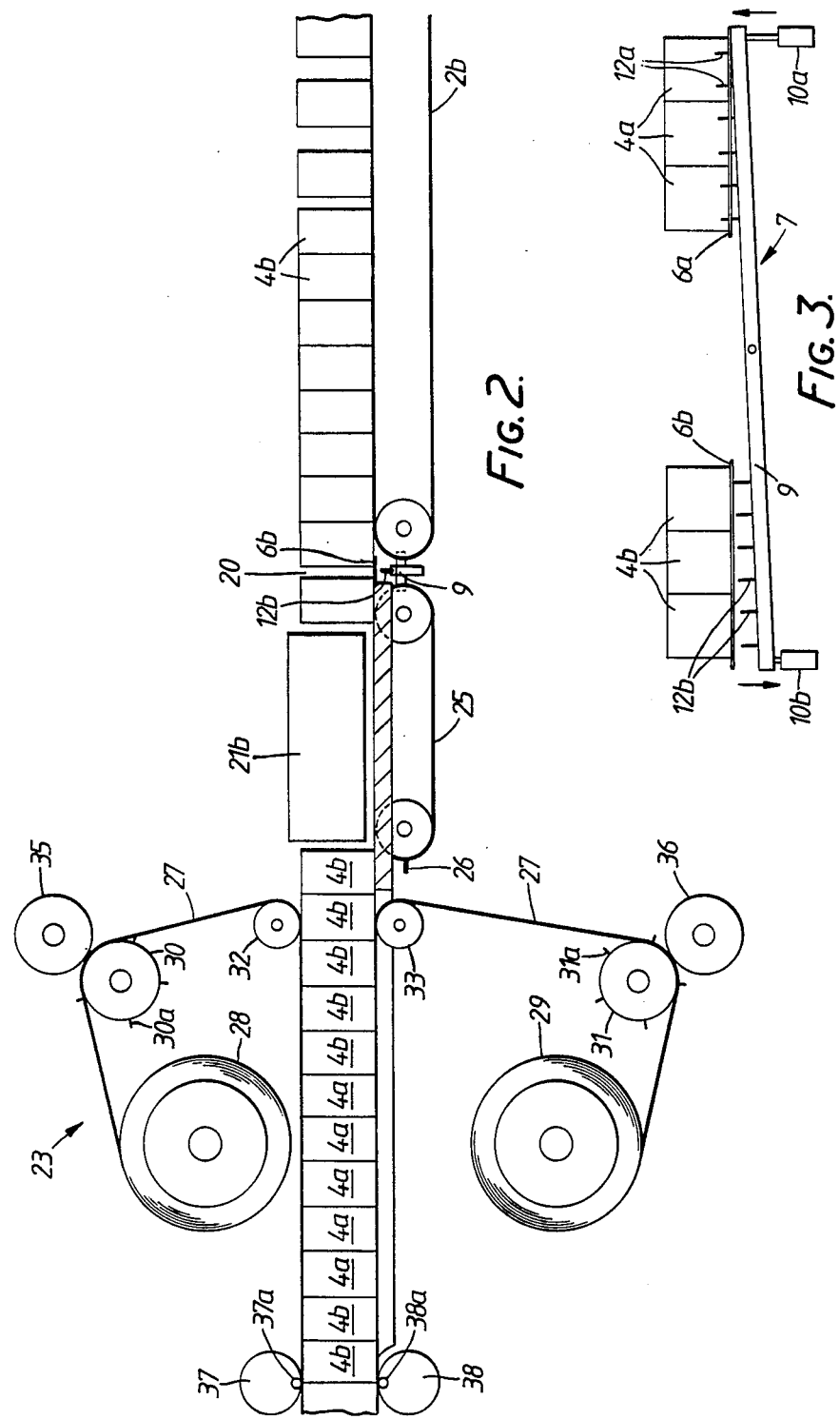

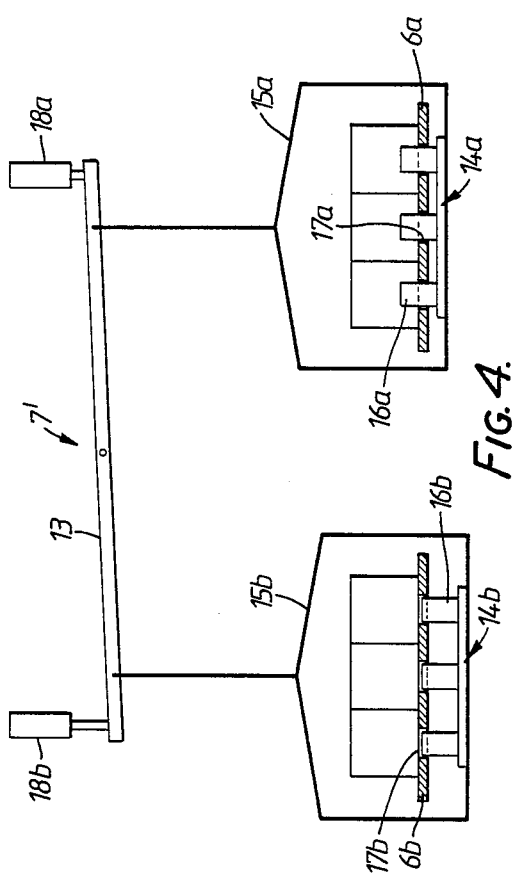
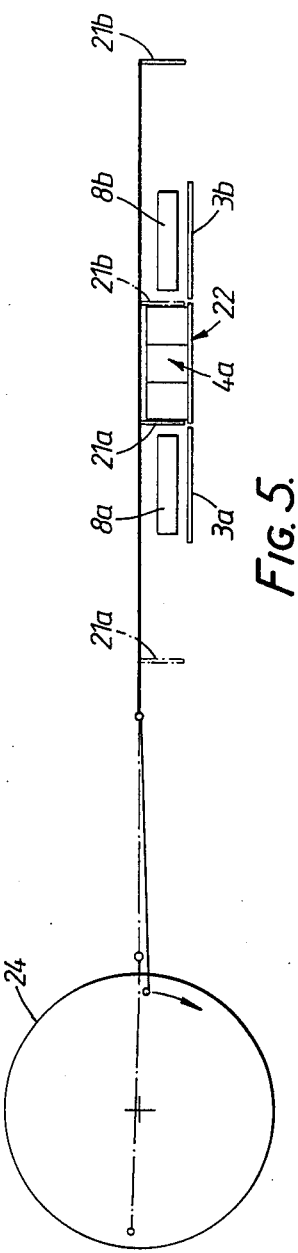
FIG. 4.
FIG. 5.

BATCHING MACHINE FOR ASSEMBLING CONTAINERS IN BATCHES

This invention relates to a batching machine for assembling containers in batches. More particularly, the invention concerns a machine for receiving cartons containing beverages, such as milk, of different flavours and dispensing the cartons in batches each of which contains a desired selection of differently flavoured beverages.

According to the invention there is provided a batching machine for assembling containers in batches comprising first and second parallel conveyor tracks including conveyors which are arranged to move continuously for moving containers along the tracks, a pivoted gate device which extends transversely with respect to the conveyor tracks and which is arranged to rock to interrupt the flow of containers along the first and second conveyor tracks alternately while allowing a predetermined number of containers on the other track to pass to an assembly station to form a group, and means at the assembly station for moving the groups of containers transversely from the first and second conveyor tracks alternately onto a conveyor track which is intermediate the first and second tracks and which is arranged to carry the groups successively to means downstream from the assembly station for securing together containers in batches each of a selected number of containers.

Preferably the gate device is solenoid operated, possibly synchronised with the first and second track conveyors, but preferably operated in response to sensors which detect when the predetermined number of containers have been moved by the first or second conveyor track to the assembly station.

The gate device preferably comprises a member carrying barrier means at each end and pivoted between the first and second conveyor tracks such that the member can be rocked to position the barrier means at one end of the member below the upper surface of one of the said conveyor tracks while positioning at least a portion of the barrier means at the other end of the member above the upper surface of the other track, and vice versa. If desired the barrier means at each end of the member may be pivotally attached to the member so that the barrier means can be maintained substantially parallel to the upper surface of the corresponding conveyor track when the member is rocked to raise and lower the barrier means.

In a preferred form of the machine in accordance with the invention the barrier means at each end of the gate member comprises a row of upwardly projecting pins or tabs.

The gate device for controlling the passage of containers to the assembly station can thus be formed as a simple, relatively light-weight device and, when solenoid operated, is particularly precise and quick acting, leading to a more efficient operation of the machine and enabling the throughput of containers to be increased.

Preferably the first and second conveyor tracks each comprise a pair of continuously moving conveyors disposed on opposite sides of the gate device, the downstream conveyor being arranged to move slightly faster than the upstream conveyor to produce a gap between successive containers on the track in the region of the gate device. This facilitates the switching of the gate device from interrupting the flow of containers on one track to interrupting the flow on the other track without fouling the containers.

A particular example of the batching machine in accordance with the invention will now be described with reference to the accompanying drawings, in which:

FIG. 2 is a diagrammatic longitudinal section through the machine taken on the line II—II in FIG. 1;

FIG. 3 is a diagrammatic transverse section through the machine taken on the line III—III in FIG. 1;

FIG. 4 is a view similar to that of FIG. 3 but illustrating an alternative arrangement; and FIG. 5 is a diagram illustrating the operation of a part of the machine.

Figure 1:
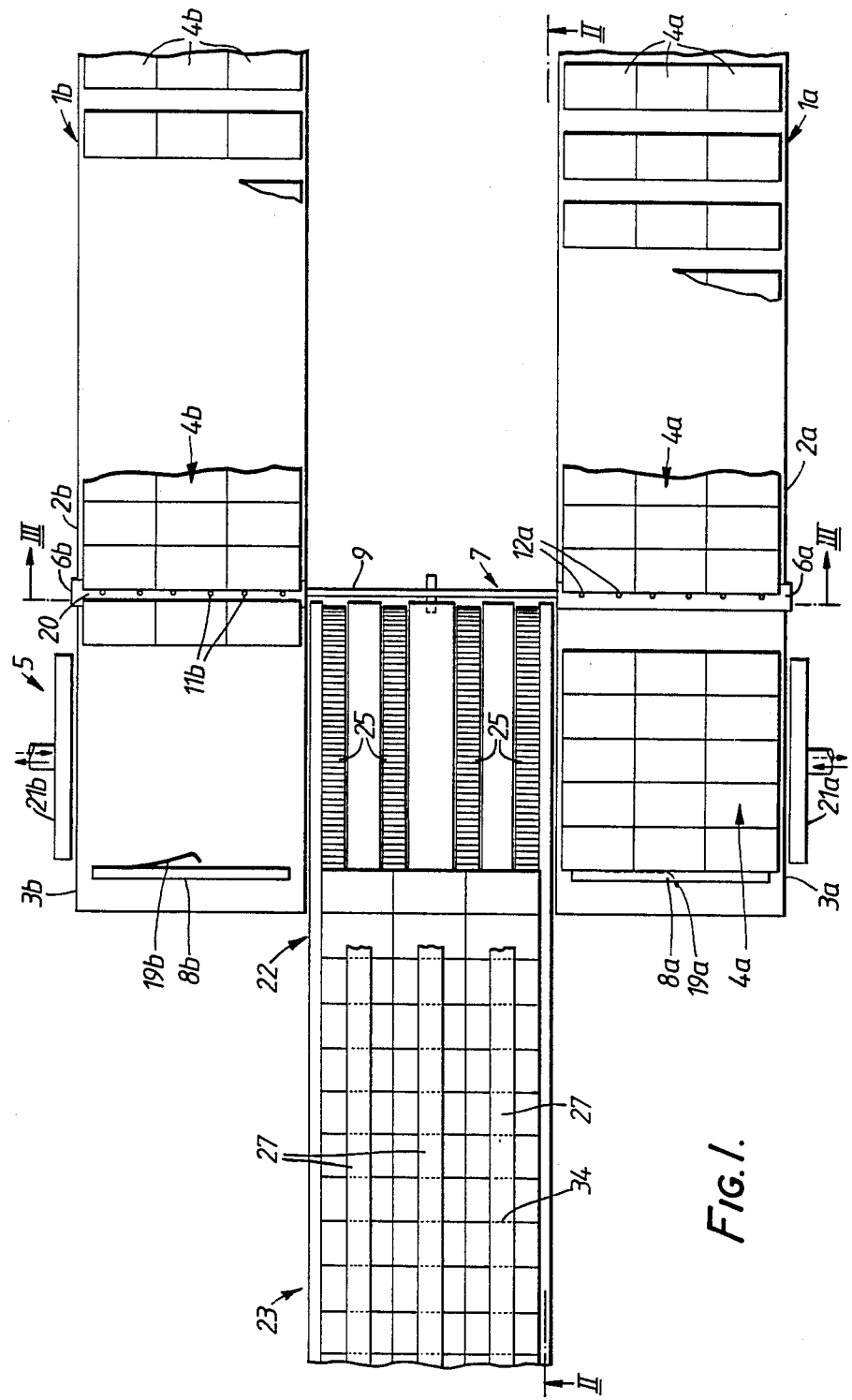
FIG. 1 is a diagrammatic plan view of part of the batching machine.

The machine illustrated is intended for the batching of similarly sized rectangular box shaped cartons containing milk or other beverage, and comprises two spaced, parallel conveyor tracks 1a,1b, each comprising two consecutive conveyors 2a,3a and 2b,3b which, in operation of the machine, are driven continuously, with the conveyors 3a,3b being driven slightly faster than the conveyors 2a,2b. Each of these conveyors may be formed by a single continuous conveyor belt or a series of parallel conveyor belts or chains.

The conveyors 2a,2b form input conveyors onto which cartons 4a,4b to be batched are placed manually, the cartons 4a containing a beverage of one flavour and the cartons 4b containing beverage of another flavour. The cartons are rectangular and are arranged in rows of three across the conveyors and in ranks longitudinally of the conveyor tracks.

The conveyors 3a,3b form part of an assembly station 5 and are arranged to receive successive rows of cartons 4a,4b from the input conveyors 2a,2b across bridging plates 6a,6b. the passage of the rows of cartons on to the assembly station conveyors 3a,3b is controlled by a gate device 7 so that groups of a predetermined number of cartons, in this case five rows of three cartons each as shown on the conveyor 3a in FIG. 1, are collected on the conveyors 3a,3b alternately against stops 8a,8b.

As perhaps best shown in FIG. 3, in this example the gate device 7 comprises a bar 9 which extends transversely with respect to the conveyor tracks 1a,1b and is pivoted approximately midway between the tracks and below the level of the surfaces of the tracks on which the cartons move so that the opposite end portions of the bar can be rocked up and down beneath the bridging plates 6a,6b in the gaps between the input and assembly station conveyors 2a,3a;2b,3b. The bar 9 is arranged to be rocked by a pair of alternately energized solenoids 10a,10b operating on opposite ends of the bar so that energizing solenoid 10a will rock the bar in a clockwise direction to raise its left-hand end and lower its right-hand end, and energizing solenoid 10 b will rock the bar in an anticlockwise direction to raise its right-hand end and lower its left-hand end as shown. Each end portion of the bar 9 is provided with a barrier 12a,12b, which in this case comprises a row of upwardly projecting pins spaced longitudinally on the bar, and when one end of the bar is raised the barrier pins at this end will project above the surface of the conveyor track 1a or 1b through suitable perforations 11a,11b in the briding plate 6a or 6b, while the barrier pins at the other end are retracted below the surface of the corresponding bridging plate.

When the barrier pins are retracted (as indicated by 12b in FIGS. 1 and 3) the cartons on the corresponding input conveyor are allowed to move over the bridging plate onto the assembly station conveyor, whereas when the barrier pins are raised (as indicated by 12a in FIGS. 1 and 3) they project into the path of the cartons and prevent this movement, the rows of cartons accordingly collecting behind the barrier with the input conveyor sliding beneath them.

If desired the barrier pins 12a,12b at each end of the bar 9 may be mounted on a support member which is pivotally attached to the bar so that the member, and hence the pins, can remain level when they are raised and lowered by rocking of the bar. In this case the pins may be guided in the vertical direction by being arranged to remain in engagement with the perforations 11a,11b of the briding plate 6a,6b.

In an alternative arrangement of the gate device shown in FIG. 4, the device 7' comprises a centrally pivoted bar 13 which extends transversely of the conveyor tracks 1a,1b as in FIG. 3 but above the level of the cartons on the tracks. Barriers 14a,14b are suspended from opposite ends of the bar 13 by means of yokes 15a,15b so that the barriers extend transversely below the bridging plates 6a,6b with upwardly projecting tabs 16a,16b of the barriers located in guide slots 17a,17b of the plates. The bar 13 is arranged to be rocked by alternately energised solenoids 18a,18b to raise and lower the barriers 14a,14b in a manner similar to that described with reference to FIG. 3. In the raised position the tabs (16a in FIG. 4) project through the bridging plate into the path of cartons on the respective conveyor track, whereas in the lowered position the tabs (16b in FIG. 4) are retracted below the surface of the track.

Turning now to the operation of the example of FIGS. 1 to 3, when the predetermined number of rows of cartons 4a for forming a desired group have been moved onto the assembly station conveyor 3a with the barrier pins 12a lowered, which may be detected by a suitable sensor such as a trip switch 19a associated with the stop 8a and responsive to the arrival of the leading row of cartons, the energization of the solenoids 10a,10b is reversed to rock the bar 9 in the opposite direction. This raises the barrier pins 12a to prevent further movement of cartons 4a onto the conveyor 3a while the cartons already on the conveyor 3a form the desired group against the stop 8a, and simultaneously lowers the barrier pins 12b to permit cartons 4b to commence moving from the input conveyor 2b onto the assembly station conveyor 3b for forming the next desired group of cartons 4b against the stop 8b. When the appropriate sensor 19b detects that the predetermined number of cartons are on the conveyor 3b, the energization of the solenoids is again reversed and the sequence is repeated, the previous group of cartons 4a having been removed from the assembly station conveyor 3a as described below.

As will be appreciated, because each assembly station conveyor 3a,3b moves slightly faster than its input conveyor 2a,2b, it will pull each transferring row of cartons away from the following row, thus opening a small gap 20 between them. The machine is arranged to operate so that when the gate device 7 is switched, the gap 20 between the fifth and sixth rows of cartons on the conveyor track which is to be blocked is located above the perforations 11a,11b of the briding plate 6a,6b to allow the barrier pins to rise without fouling the cartons.

At the assembly station 5 a pair of push plates 21a,21b are provided for pushing the groups of cartons 4a,4b which collect on the conveyors 3a,3b against the stops 8a,8b alternately transversely onto a central conveyor track 22 which is disposed between the conveyors 3a and 3b and extends downstream therefrom towards a batching station 23. The pusher plates 21a and 21b are arranged to reciprocate transversely across the assembly station conveyors 3a,3b respectively in a controlled manner, for example linked to the movement of the conveyors 3a,3b so that each plate 21a,21b moves to push a group of cartons from the corresponding conveyor 3a,3b onto the central conveyor 22 a predetermined time after the gate device 7 has been operated to raise the barrier pins 12a, 12b in front of the said conveyor 3a,3b, and subsequently moves back clear of the conveyor 3a,3b before or shortly after the barrier pins are lowered when the gate device is next switched.

In the present example the push plates 21a,21b are connected together and are reciprocated continuously in synchronism with each other and with the conveyors 3a,3b by means of a crank 24 as shown in FIG. 5. The crank 24 and the various conveyors of the machine are preferably driven, through suitable gearing, from the same motor (not shown). FIG. 5 shows the push plates 21a,21b at one end of their stroke where the plate 21 has just pushed a group of cartons 4a onto the central conveyor track 22, and indicates in dotted lines their positions at the opposite end of their stroke in which the plate 21b is operative to push a group of the other cartons 4b onto the conveyor track 22.

The central conveyor track 22 comprises a number of continuously moving parallel conveyor chains 25 provided with projections 26 (FIG. 2) for pushing the groups of cartons 4a,4b received alternately from the assembly station conveyors 3a,3b to the batching station 23 end to end in corresponding ranks, and thereby simultaneously advancing the cartons already at the batching station. As will be appreciated, in this example the batching station 23 therefore receives five rows each of three cartons 4a alternately with five rows each of three cartons 4b, and the batching station is arranged to connect and divide each of the three continuous ranks which are thus formed into batches each of five cartons comprising either three cartons 4a and two cartons 4b or two cartons 4a and three cartons 4b.

At the batching station 23 the three ranks of cartons pass through an adhesive tape dispensing system for applying self-adhesive tape 27 longitudinally along the top and bottom of each rank of cartons. This dispensing system comprises similar upper and lower dispensers each comprising three tape supply reels 28,29 arraned to dispense tape 27 onto three perforating rollers 30,31 from which in turn the tape passes around three applicator rollers 32,33 which press the perforated tape 27 against the top and bottom of the three ranks of cartons. Each perforating roller 30,31 carries five rows of pins 30a,31a equally spaced apart around its periphery at a circumferential distance equal to the dimension of each carton in the longitudinal direction of the ranks, and is arranged so that the perforated tape 27 is applied with the perforations 34 in registry with the junctions between successive cartons as indicated in FIG. 1.

Vaned rollers 35,36 may be provided, as shown, to press the adhesive tape 27 against the perforating rollers 30,31 to assist in the perforation of the tape which passes in the nip of the two rollers. The vaned rollers 35,36 have peripheral grooves which register with the pins 30a,31a on the perforating rollers, and which accommodate the pins after they have perforated each successive portion of the tape.

As the three ranks of cartons emerge from the tape dispensing system, each carton is rigidly secured to the next carton in the rank by the runs of tape 27 adhering to its top and bottom surfaces, and in order to sever the ranks into batches of five cartons as desired, two rollers 37,38 are mounted downstream of the tape dispensing system to abut the upper and lower surfaces of the cartons, each roller 37,38 having in its periphery an electrically heated wire 37a,38a. These rollers are synchronised with the tape perforating rollers 30,31 so that the heated wire 37a,38a engages the upper and lower tapes at each fifth row of perforations 34, and fuses the tapes to separate the cartons into the desired batches.

The separated batches of cartons can then be gathered together in groups, for example each of six batches comprising three batches across the conveyor and two batches along the conveyor, and packaged securely into trays of suitable size.

I claim:

1. A batching machine for assembling containers in batches comprising:
   first and second conveyor tracks disposed parallel to each other, said first and second tracks including conveyors adapted to move continuously for moving containers along said first and second tracks,
   a pivoted gate device mounted to extend transversely with respect to said first and second conveyor tracks and adapted to rock to interrupt the flow of said containers along each of said first and second conveyor tracks alternately while allowing said containers on the other of said first and second conveyor tracks to pass;
   an assembly station disposed downstream of said gate device for collecting into groups said containers allowed to pass on each of said first and second conveyor tracks by said gate device;
   a third conveyor track disposed intermediate said first and second conveyor tracks at said assembly station and extending downstream therefrom;
   transfer means at said assembly station for moving said groups of containers transversely from said first and second conveyor tracks alternately onto said intermediate third conveyor track; and
   securing means downstream from said assembly station and adapted to receive said groups of containers carried downstream in succession on said third conveyor track and to secure together said containers in batches each consisting of a preselected number of containers.

2. A batching machine as claimed in claim 1, wherein said gate device comprises a member having first and second opposite ends, barrier means mounted at each of said first and second ends, and means pivotally mounting said member between said first and second conveyor tracks whereby said member is adpated to rock to position said barrier means at said first end of said member below the upper surface of said first conveyor track while positioning at least a portion of said barrier means at said second end of said member above the upper surface of said second conveyor track, and vice versa.

3. A batching machine as claimed in claim 2, wherein said barrier means at each of said first and second ends of said member is pivotally attached to said member whereby said barrier means is adapted to remain substantially parallel to said upper surface of said corresponding one of said first and second conveyor tracks when said member is rocked to raise and lower said barrier means.

4. A batching machine as claimed in claim 2, wherein said barrier means at each of said first and second ends of said member comprises a row of pins projecting upwardly from said member.

5. A batching machine as claimed in claim 2, wherein said means pivotally mounting said member is disposed below the level of said upper surface of each of said first and second conveyor tracks.

6. A batching machine as claimed in claim 2, wherein said means pivotally mounting said member is disposed above the level of said upper surrface of each of said first and second conveyor tracks.

7. A batching machine as claimed in claim 1, including solenoid means for rocking said gate device.

8. A batching machine as claimed in claim 7, wherein said assembly station includes first and second stops associated with said first and second conveyor tracks respectively, said groups of containers collecting at said assembly station against said stops, each of said first and second stops including a sensor responsive to the arrival thereat of the leading container of a group to control the operation of said gate device solenoids.

9. A batching machine as claimed in claim 1, wherein said conveyors of each of said first and second conveyor tracks comprise a pair of continuously moving conveyors disposed on the upstream and downstream sides of said gate device, said downstream conveyor being adapted to move slightly faster than said upstream conveyor to produce a gap between successive containers on said conveyor track in the region of said gate device.

10. A batching machine as claimed in claim 1, wherein said transfer means at said assembly station comprises first and second pushers, and means for reciprocating said first and second pushers transversely across said first and second conveyor tracks respectively in a controlled manner whereby each of said first and second pushers moves to push a group of containers onto said third conveyor track from said corresponding one of said first and second conveyor tracks after said gate device is rocked to block said corresponding one of said first and second conveyor tracks.

11. A batching machine as claimed in claim 10, wherein said first and second pushers are connected together and said reciprocating means is operative to reciprocate said first and second pushers continuously in synchronism with said first and second conveyor tracks which move said containers to said assembly station.

12. A batching machine as claimed in claim 1, wherein said securing means comprises adhesive tape applicators for securing said containers together by strips of adhesive tape, means for forming transverse rows of perforations in said tape at intervals along said tape corresponding to the intervals between successive containers to faciliate separation of each of said containers from the adjacent container, and heated means synchronised with the movement of said taped containers on said third conveyor track to apply heat at selected positions on said tape to fuse said tape and thereby separate said succession of taped containers into said batches containing said preselected number of containers.

13. A batching machine as claimed in claim 12, wherein said heating means comprises a roller adapted to rotate in synchronism with the movement of said taped containers on said third conveyor track, and an electrically heated wire located in the periphery of said roller.

* * * * *